(12) United States Patent
Norris et al.

(10) Patent No.: US 8,938,490 B2
(45) Date of Patent: Jan. 20, 2015

(54) SYSTEM AND METHOD FOR ACCESSING MAINFRAME SYSTEM AUTOMATION FROM A PROCESS AUTOMATION APPLICATION

(71) Applicant: CA, Inc., Islandia, NY (US)

(72) Inventors: Diane P. Norris, Canonsburg, PA (US); Glenn McDougall, Bluffton, SC (US); Ashish Pokharel, Falls Church, VA (US)

(73) Assignee: CA, Inc., New York, NY (US)

( * ) Notice: Subject to any disclaimer, the term of this patent is extended or adjusted under 35 U.S.C. 154(b) by 248 days.

(21) Appl. No.: 13/670,789

(22) Filed: Nov. 7, 2012

(65) Prior Publication Data

US 2014/0129611 A1 May 8, 2014

(51) Int. Cl.
*G06F 15/16* (2006.01)
*G06F 15/173* (2006.01)

(52) U.S. Cl.
USPC ............ 709/202; 709/223; 709/224; 709/226

(58) Field of Classification Search
CPC .............................. H04L 69/329; H04L 67/16
USPC ................. 709/226, 202, 223, 224, 225, 227; 719/318; 710/1; 705/50
See application file for complete search history.

(56) References Cited

U.S. PATENT DOCUMENTS

| | | | | |
|---|---|---|---|---|
| 6,421,742 | B1 * | 7/2002 | Tillier | 710/1 |
| 6,714,979 | B1 * | 3/2004 | Brandt et al. | 709/225 |
| 7,225,249 | B1 * | 5/2007 | Barry et al. | 709/227 |
| 8,073,777 | B2 * | 12/2011 | Barry et al. | 705/50 |
| 8,204,992 | B2 * | 6/2012 | Arora et al. | 709/201 |
| 8,346,929 | B1 * | 1/2013 | Lai | 709/226 |
| 8,625,752 | B2 * | 1/2014 | Dunsmuir | 379/88.18 |
| 8,689,240 | B2 * | 4/2014 | Elko et al. | 719/318 |

* cited by examiner

*Primary Examiner* — Quang N Nguyen
(74) *Attorney, Agent, or Firm* — Coats & Bennett, PLLC

(57) ABSTRACT

A system and computer-implemented method communicatively interfaces a Process Automation (PA) application executing on a mainframe computer with a mainframe automation function executing on the mainframe computer. The PA application executes within a services layer, which runs on top of a base Operating System (OS) layer of the mainframe computer. Some automation functions execute within the base OS layer, while other automation functions within the services layer. Therefore, an interface executing within the services layer determines which of the two disparate execution environments is needed to execute a given mainframe automation function, and invokes the function within the appropriate environment.

20 Claims, 5 Drawing Sheets

SYSTEM AND METHOD FOR ACCESSING MAINFRAME SYSTEM AUTOMATION FROM A PROCESS AUTOMATION APPLICATION

TECHNICAL FIELD

The present disclosure relates generally to Process Automation (PA) applications executing automated functions on mainframe computer systems, and more particularly to systems and methods for communicatively interfacing PA applications with automation applications executing on the mainframe computer systems.

BACKGROUND

Process Automation (PA) applications focus on automating high-level business processes across disparate systems. For example, business processes generally include a plurality of actions and/or functions that are normally executed on workstations, servers, and mainframe systems. Such actions and functions include, for example, those needed to perform certain tasks such as adding or deleting an employee, preparing for system outages, and generating automatic reports. Thus, a PA application associated with the business process may be required to automate the execution of these actions and/or functions on the mainframe system as part of automating the overall business process.

Because PA applications operate at a high-level, they are typically not as efficient or effective at handling mainframe automation as applications that are specifically designed and written to perform mainframe automation. As such, most users simply either invoke existing mainframe automation manually outside of the PA application or attempt to implement existing mainframe automation into their PA applications. However, implementing mainframe automation into a PA application requires converting existing, sophisticated mainframe automation constructs into new automation constructs that are compatible with the PA applications. Such efforts are time consuming and expensive, and the resultant PA application is unlikely to be as effective or as efficient as an existing mainframe automation application specifically designed and written to perform the mainframe automation.

SUMMARY

According to one aspect of the present disclosure, a system and computer-implemented method communicatively interfaces a Process Automation (PA) application executing on a mainframe computer with a mainframe automation function executing on the mainframe computer. In one embodiment, an interface receives a request from an agent process executing on a mainframe computing device to perform a function on the mainframe computing device. The request includes information that identifies a corresponding target program to be executed on the mainframe computing device. Upon receiving the request, the interface determines whether the target program is to be executed on the mainframe computing device synchronously or asynchronously. The determination may be based on, for example, an indicator received with the request. If the indicator indicates that the target program is to be executed synchronously, the interface will execute the target program in a services layer of the mainframe computing device. If the indicator indicates that the target program is to be executed asynchronously, however, the interface will execute the target program in a base Operating System (OS) layer of the mainframe computing device.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
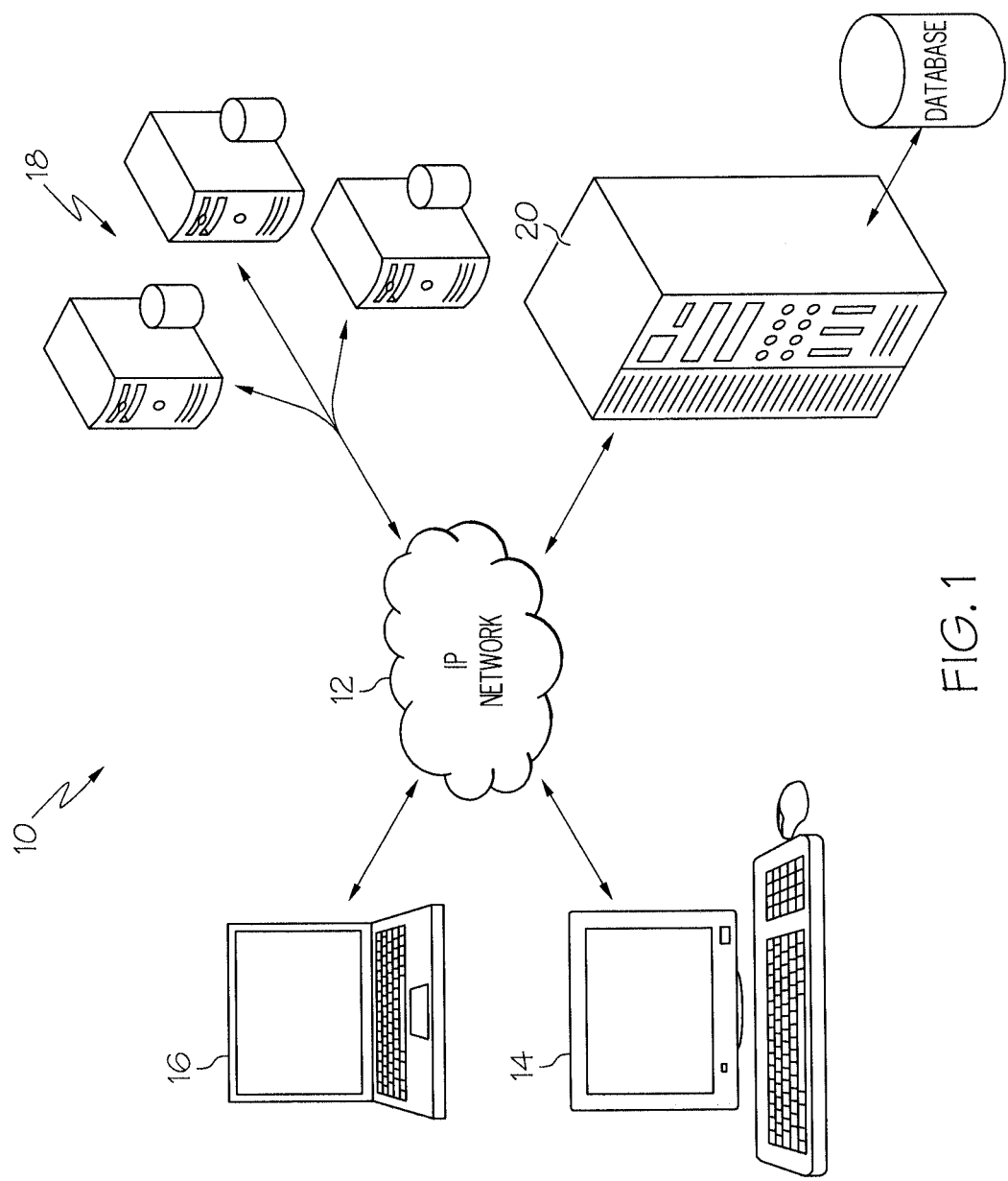
FIG. 1 is a block diagram illustrating a communications network configured according to one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, one aspect of the present disclosure provides a system and computer-implemented method for communicatively interfacing a Process Automation (PA) application executing on a mainframe computer with one or more mainframe automation functions that are also executing on the mainframe computer. Particularly, the PA application executes within a services layer, which runs on top of a base Operating System (OS) layer of the mainframe computer. Examples of such a services layer include, but are not limited to, the Unix® Systems Services (USS) layer and the Time Sharing Option (TSO), both of which are associated with the well-known z/OS of IBM System z®. Some of the automation functions execute in an execution environment provided within the base OS layer, while other automation functions execute in a different execution environment within the services layer. An interface executes within the services layer and communicatively connects the PA Application to the mainframe automation functions executing in both the services layer and the base OS layer. More specifically, the interface determines which of the two disparate execution environments is needed to execute a given mainframe automation function, and invokes the function within the selected environment. In some embodiments, the interface also returns data from the executed automation functions to the PA application.

Communicatively interfacing the PA application with the mainframe automation functions as described herein allows operators to better incorporate automated mainframe functions into the overall automated business processes created in the PA application. Additionally, the interface provides operators with the capability of leveraging existing sophisticated mainframe automation functions that are already included with the mainframe applications. Such functions include, but are not limited to, automating the creation, modification, and testing of mainframe security resources, automating mainframe workload and capacity provisioning, automating mainframe resource states, and automating system startup and shutdown. Further, the interface simplifies the manual, error-prone processes that operators conventionally performed to effect business processes. By way of example, business processes associated with human resources (e.g., adding or removing an employee), finance (e.g., submitting and processing expense reports), and Information Technology (e.g., performing fail-over and disaster recovery procedures), are all examples of automated processes that may benefit from the aspects of the present disclosure.

Referring now to the drawings, FIG. 1 is a block diagram illustrating a system 10 configured to perform a business process in accordance with one or more embodiments of the present disclosure. The system 10 comprises a communications network 12 communicatively interconnecting a plurality of user workstations 14, 16, and any number of other client or network-based computing devices (not shown), with one or more network servers 18 and a mainframe computer 20. Generally, network 12 comprises a communications network capable of communicating audio, video, signals, data, messages, and the like, between the workstations 14, 16, the servers 18, and mainframe 20, as well as other computing devices not specifically shown herein. Such networks generally include, but are not limited to, public or private data networks, Local Area Networks (LANs), Wide Area Networks (WANs), local, regional, or global computer networks, such as the Internet, for example, wireless and/or wireline networks, intranet networks, and any combination thereof.

Network 12 communicates information between the workstations 14, 16, the servers 18, and mainframe 20, for example, in packet data flows. Network 12 may utilize any protocol known in the art to communicate the data packets; but in one embodiment, network 12 employs a packet-based communication protocol such as the Internet Protocol (IP) to communicate the data packets. Network 12 may also operate according to one or more other communications protocols and technologies defined by any known standard as needed or desired. Some example standards include, but are not limited to, those standards promulgated by one or more well-known bodies and organizations such as the Institute of Electrical and Electronics Engineers (IEEE) Inc., the International Telecommunications Union (ITU-T), the European Telecommunications Standards Institute (ETSI), the Internet Engineering Task Force (IETF), the Third Generation Partnership Project (3GPP), and the like.

Workstations 14, 16 may comprise any workstation known in the art, such as a desktop or mobile computing device. A network operator associated with the workstation 14 or 16, or with some other computing device connected to network 12, may store and retrieve data to and from a database associated with one or more of the network servers 14, 16, as well as maintain and control the data within the database. To accomplish this, network servers 18 and the workstation 14, 16, are each equipped with one or more processors, memory, and communication interfaces, and the like, as is known in the art. Additionally, as described in more detail later, the user may utilize one or both of the workstations 14, 16 to communicate data with, and control, one or more mainframe automation functions executing on mainframe 20.

The network servers 18 may comprise any suitable computing devices operable to process data. Some examples of the network servers 18 include a host computer, a workstation, a web server, a file server, a personal computer such as a desktop or laptop computer, for example, or any other device operable to process data. Each of the network servers 18 may execute with any of the well-known operating systems such as MS-DOS, PC-DOS, OS-2, MAC-OS, MICROSOFT WINDOWS, UNIX, or other appropriate operating system, and execute computer programs that allow other computers, such as workstations 14, 16, to access and manipulate data stores associated with the network servers 18. To that end, one or all of the network servers 18 may include or have access to one or more databases that store and organize data in one or more tables or similar structures for a user.

The mainframe 20 is generally a large, high-performance computing processing system capable of performing many thousands of instructions per second. Typically, such mainframes 20 are ultra-reliable and employed by companies, governments, and other organizations to perform large-scale and complex business and scientific computing. To accomplish its function, mainframe 20 is usually provided with a plurality of microprocessors, a communication connection to one or more other computing devices via network 12, and memory (e.g., FIG. 2). One example of such a mainframe 20 is the IBM System z®, although those of ordinary skill in the art will readily appreciate that other mainframe computing systems currently exist and are suitable for configuration according to the present disclosure.

The mainframe 20 includes a base Operating System (OS) and a services layer, such as the USS layer, which is, in most cases, distributed as a component of the base OS. The particular base OS and/or the services layer component may differ across different types of mainframe machines; however, in one embodiment, mainframe 20 runs the well-known z/OSO and z/OS Unix System Services (z/OS Unix®) associated with the IBM® Z-series of mainframe computers.

The services layer and the base OS layers each provide different functions as well as execution environments for executing application programs. Particularly, the base OS layer provides the mainframe 20 with the resources and common services for applications executing on the mainframe 20. The services layer component, which runs on top of the base OS layer, facilitates the execution of applications developed for platforms or environments that are different than that of the base OS layer of mainframe 20. For example, the USS services layer provides an environment in which Unix®-based applications that are not native to the mainframe 20 platform can execute on the mainframe 20 platform. In accordance with embodiments of the present disclosure, one or more mainframe automation functions may execute within the services layer.

As described in more detail below, the mainframe 20 includes an interface configured according to the present disclosure. The interface receives data regarding one or more mainframe automation functions that are to be executed on the mainframe 20. Based on the received data, the interface determines whether the mainframe automation functions are to be executed within the services layer or within the base OS layer, and then executes the identified mainframe automation functions in an appropriate execution environment within the selected layer. Additionally, where no execution environment currently exists, the interface may also provide the commands required to set up and configure an execution environment prior to executing the identified mainframe automation functions in that environment.

Figure 2:
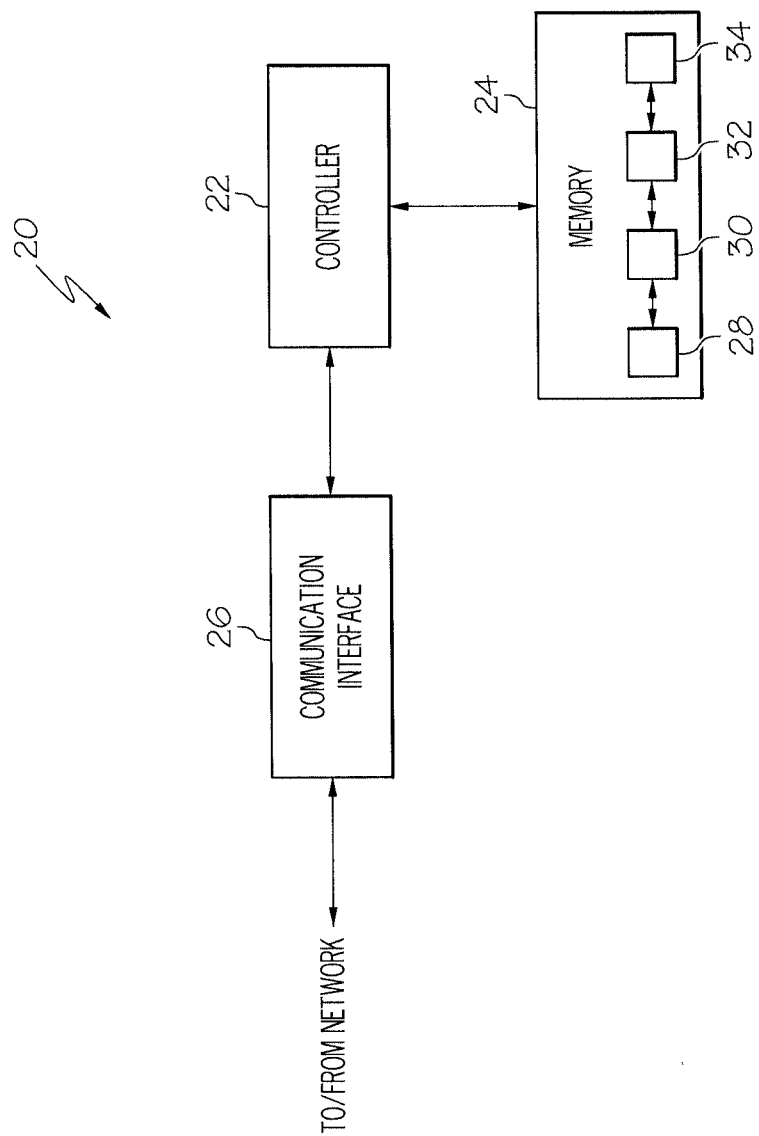
FIG. 2 is a block diagram illustrating a logical view of some components of a mainframe computing device configured according to one embodiment.

FIG. 2 is a functional block diagram illustrating some components of a mainframe 20 configured to operate according to one or more embodiments of the present disclosure. These components include, as seen in FIG. 2, a programmable controller 22, a memory 28, and a communications interface 26. As those of ordinary skill in the art will appreciate, other components are generally included in the mainframe 20, but are not explicitly illustrated here for ease of discussion. Mainframe 20 may execute with any appropriate operating system such as z/OS on IBMs System z®.

The programmable controller 22 may be implemented by one or more microprocessors, hardware, firmware, or a combination thereof, and generally controls the operation and functions of the mainframe 20 according to the appropriate standards. Such operations and functions include, but are not limited to, communicating data with the network servers 18 and the workstations 14, 16, as previously described, and controlling the mainframe 20 to perform mainframe automation functions associated with specified automated processes. In this regard, the programmable controller 22 may be configured to the implement logic and instructions stored in memory 24, as described in more detail below.

The communications interface 26 comprises a transceiver or other communications interface that facilitates the communications with the network servers 18, and the workstations 14, 16 via IP network 12. The memory 24 may comprise any non-transitory, solid state memory or computer readable media known in the art. Suitable examples of such media include, but are not limited to, ROM, DRAM, Flash, or a device capable of reading computer-readable media, such as optical or magnetic media. The memory 24 stores programs and instructions, such as the PA orchestrator 28, PA application agent 30, a PA connector 32, and an OPS connector 34 that, when executed by the controller 22 on mainframe 20, causes the programmable controller 22 to selectively invoke one of a plurality of disparate execution environments. Particularly, a first execution environment runs in the base OS layer, while a second, different execution environment runs in the services layer.

As stated above, the system and method of the present disclosure allow a user of a workstation 14, 16 to perform and control automated business processes that include automated functions on the mainframe 20. The process may be, for example, some business-related process such as adding a new employee to the system. Other processes may be deleting a person from the system, starting or stopping a system, provisioning and controlling system resources, processing expense reports, executing various reports, and the like. Each of these processes typically requires the execution of a plurality of actions or events, some of which may be associated with different or corresponding functions that execute in a selected one of the execution environments on the mainframe 20.

More particularly, the user could first create, via a Graphical User Interface (GUI) executing on workstation 14, 16, an automated process to add a new employee (e.g., "AddEmployee"). To create the automated process in the PA application, the user defines each of the plurality of actions or events using one or more predetermined "operators." Each operator is an object comprising the code and/or data corresponding to a different function that is executed as part of the AddEmployee process. By way of example, the AddEmployee process could include an email operator that, when invoked, generates and sends an email to the facilities department of the user's company to request a cubicle assignment for a new employee. Additionally, the process could include other operators, such as a service desk operator that automatically opens a ticket to procure the employee a laptop, a script operator that executes a script defining a default network user ID and password for the employee, and a mainframe automation security operator that invokes mainframe automation to create and test mainframe security definitions for the new employee.

The operators may be written using any language or methodology needed or desired, but in one embodiment, comprise REXX-based programs and functions that execute within the REXX-based environments on mainframe 20. Table 1 provides examples of some of the PA mainframe automation operators that may be used to invoke OPS REXX-based programs on mainframe 20. However, other operators, as will be understood by those of ordinary skill in the art, may also be created and invoked as part of the AddEmployee process, or as part of any other automated process being executed by the PA orchestrator 28.

TABLE 1

| OPERATOR | DESCRIPTION |
| --- | --- |
| GetResourceState | Used to invoke a target OPS/MVS REXX program (PAZGSTE) to obtain the state (e.g., UP, DOWN, UNKNOWN) of a specified resource (e.g., DB2, CA7, IMS) from the OPS/MVS state management tables on the mainframe. Execution of PAZGSTE is synchronous. The resource state is returned in an operator variable. |
| SetResourceState | Used to invoke a target OPS/MVS REXX program (PAZSSTE) to set the state (e.g., UP, DOWN, UNKNOWN) of a specified resource (e.g., DB2, CAT, IMS) in the state management tables. This program, when executed, causes an action to be performed on the resource (e.g., UP starts the resource, DOWN shuts the resource down, etc.). Execution is synchronous. Confirmation of state set is returned in an operator variable. |
| RunSynchExec | Used to invoke a specified target OPS/MVS REXX program synchronously. Any target OPS/MVS REXX program can be specified, thereby allowing clients to invoke any existing (and future) OPS/MVS REXX programs that they have developed for automating a process (e.g., starting/stopping systems, gathering and acting on system environmental data, defining security, and responding to errors). This operator facilitates access to all OPS/MVS automation functions. The synchronous execution architecture also provides the ability for data to be returned to the custom operators for use later in the processes. In the context of the previous 'add new employee' automated process example, the RunSynchExec operator would be used as the mainframe automation operator to 'define and test mainframe security'. A client-created OPS/MVS REXX target program would be invoked by the RunSynchExec operator. The client-created target program would perform the required actions to create and test mainframe security resource definitions for the new employee. |
| RunAsynchExec | Performs the same as the RunSynchExec operator, but is used to invoke a specified target OPS REXX program asynchronously. Does not allow for the return of data from the target OPS REXX program. |

The automated AddEmployee process, as well as other automated processes, are created, stored, administered, and executed using an application known as a PA application "orchestrator" 28. An "orchestrator" may execute, for example, on a server or a workstation running, for example, Windows® or Linux®, or as in the current embodiment, within the services layer (e.g., the USS layer) of a mainframe computing device such as mainframe 20.

The automated processes, such as the AddEmployee process, are generally invoked from a GUI provided as part of the PA orchestrator 28. Each operator in the process is directed to a PA Agent 30 executing on a platform that is appropriate for the function of the operator. For example, the email operator might be directed to a PA Agent 30 executing on a Windows email server, while the service desk operator could be directed to a PA Agent 30 executing on a Windows server running a service desk application. Similarly, the script operator might be directed to a PA Agent 30 executing on a Linux server, and the mainframe automation security operator could be directed to a PA Agent 30 executing on a mainframe running a mainframe automation application.

When the PA orchestrator 28 directs an operator to a selected PA Agent 30 for execution, the PA orchestrator 28 also sends, via the network 12, the code instructions and/or data required by the PA Agent 30 to execute the operator functions. For example, the code instructions and data for the previously mentioned mainframe automation security operator in the AddEmployee process may be sent to a PA Agent 30 executing in the services layer of mainframe 20. Upon receipt, the PA Agent 30 determines which mainframe automation application to invoke to provide the security automation function specified by the operator. Additionally, if needed, the PA Agent 30 creates the necessary execution environment in which to execute the automation application. Thereafter, the PA Agent 30 executes the operators to perform the intended function.

To accomplish this, as seen in more detail later, the mainframe 20 includes a "PA Connector" object 32 and an "OPS Connector" object 34. Each Connector 32, 34 comprises code and instructions for executing the received operators at the direction of the PA Agent 30. More particularly, based on the data received with the mainframe automation security operator, for example, the PA Connector 32 may determine that an OPS/MVS Event Management and Automation application executing on the mainframe is to perform the automated security function. In such cases, the PA Connector 32 could then create an OPS/MVS OPS REXX execution environment, for example, and invoke the OPS Connector 34 within that environment. The OPS Connector 34 would then execute a predetermined command, such as a "define and test security" OPS/MVS OPS REXX exec command, for example, to perform the automated function of defining and testing mainframe security definitions for the employee.

Figure 3:
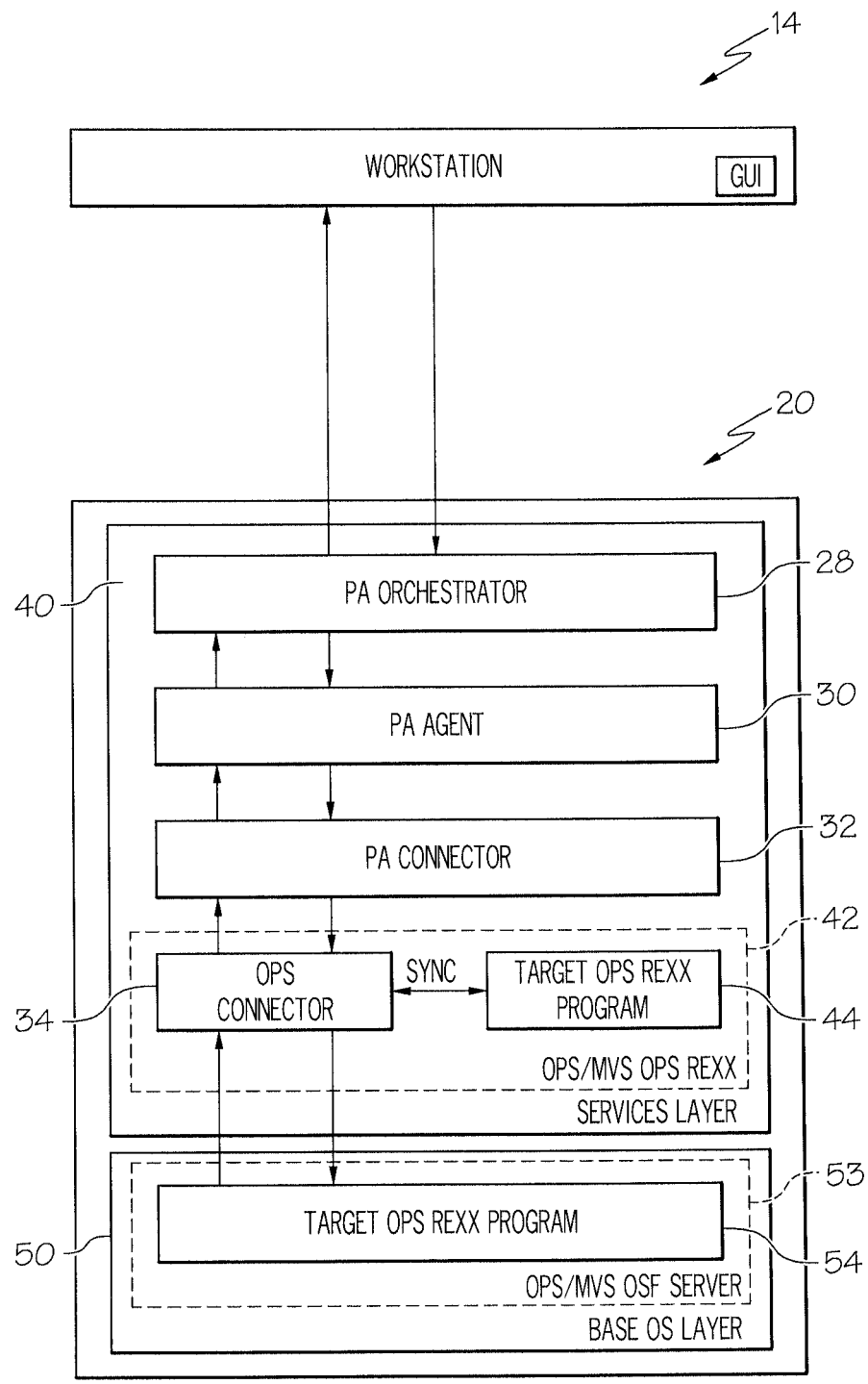
FIG. 3 is a block diagram illustrating an architecture for communicatively interfacing Process Automation (PA) applications with functions executing on the mainframe computing device according to one or more embodiments.

FIG. 3 is a block diagram illustrating an architecture for the interface of the present disclosure in more detail. As previously stated, the mainframe 20 includes a services layer 40 that runs on top of the base OS layer 50. Each layer may have an execution environment 42, 52, invoked within it to facilitate the execution of target programs and functions, such as the OPS REXX-based programs and functions previously mentioned, within that layer. Particularly, the OPS/MVS Event Management and Automation OPS REXX execution environment 42 ("OPS REXX 42") provides an execution environment for OPS/MVS OPS REXX-based programs 44 within the services layer, while the OPS/MVS Operator Server Facility (OSF) Server execution environment 52 ("OSF Server 52") provides an execution environment for REXX-based programs within the base OS layer 50.

The PA orchestrator 28, PA Agent 30, the PA Connector 32, and the OPS Connector 34 also execute within the services layer 40 on mainframe 20. The PA orchestrator 30 and the PA Agent 32 are executed by the controller 22 and provide a "front-end" into mainframe functions and applications for workstation 14. These include mainframe automation applications providing automation functions such as automated state management of mainframe resources (e.g., starting jobs, stopping, monitoring jobs/tasks/resources), automated routine mainframe tasks (e.g., updating security definitions, preparing the system for and applying system maintenance, replying to outstanding system messages, etc.) and automated error detection and remediation on the mainframe 20 (e.g., cancelling jobs/tasks that exceed a predetermined CPU usage threshold, detecting and cancelling jobs/tasks that may be executing in an endless loop, gathering diagnostic information for errors, etc.).

In one or more embodiments, the PA orchestrator 28 is configured to provide a workstation, such as workstation 14, with the GUI that is utilized to create an automated business process. As previously stated, the PA orchestrator 28 can execute on a Windows server, Linux server, or in the services layer on a mainframe. A user may utilize the GUI to launch automated business processes. As an automated process runs on the PA orchestrator 28, individual operators in the process are targeted for execution by PA Agents running on appropriate platforms. In this embodiment, for example, mainframe automation operators are targeted for execution by PA Agent 30 running within the services layer 40 on mainframe 20.

Particularly, the PA orchestrator 28 provides the code instructions and data specific to execution of the mainframe automation operator to the PA Agent 30 on mainframe 20 via the network 12. Such data includes, but is not limited to, an indication of a particular application to be invoked (e.g., OPS/MVS), the name of a target program that will be executed to perform the function (e.g., an OPS/MVS OPS REXX program), one or more specific parameters required by that program (e.g., the identity of a particular resource for which a desired state is to be attained, a user ID, a password for new employee, etc.), and an indication of whether the program is to be executed as a synchronous or asynchronous program. For synchronous execution, the target program is executed in the OPS REXX 42 environment. For asynchronous execution, the target program is executed in the OSF Server 52 environment.

Executing the target program synchronously means that control is not returned to the mainframe automation operator until the target program has completed execution in the OPS REXX 42 environment. Therefore, the automated process does not continue execution until the mainframe automation has completed. Synchronous execution also allows the target program to return data to the mainframe operator as variable data. Such data can then be used by the operator and subsequent operators in the automated process. Executing the target program asynchronously, however, means that control is returned to the mainframe automation operator as soon as the target program is queued for execution in the OSF Server 52 environment. That is, the operator does not wait for execution of the target program to complete. Therefore, the automated process can continue execution asynchronously with the target program.

Upon receiving the code instructions and data from the PA orchestrator 28, the PA Agent 30 calls the PA Connector 32 and provides the received information to the PA Connector 32. The data is specified as operator parameter values within the mainframe automation operator, and may be set when the user creates the automation process and modified as needed each time the process is executed. The PA Agent 30 may receive return data from the PA Connector 32 upon completion of the programs, and return that data in a reply message to the PA orchestrator 28 for inclusion in the operator as variable data. For example, a given target program may return a state of a resource to the PA Connector 32. The returned state value is then passed to the PA orchestrator 28 via the PA Agent 30 and made available as a variable in the GetResourceState operator.

The PA Connector 32 is an interface module comprising logic and instructions that, when executed by controller 22, receives the data from PA Agent 30. Based on the received data, the PA Connector 32 first determines which mainframe product is required. The mainframe automation operators include a client-settable 'subsystem' parameter that indicates which mainframe subsystem should be used to perform the operator function. If the subsystem specified begins with the characters "OPS," the PA Connector 32 recognizes that OPS/MVS is the mainframe application that is required. The PA Connector 32 issues a command to initialize an OPS REXX 42 environment within the services layer 40, and execute the OPS Connector 34 within the OPS REXX 42 environment. The command may be, for example, the well-known "OPSIMEX" or "OI" command that is used to create an OPS/REXX 42 environment in the services layer 40 and execute OPS/MVS REXX programs, such as the OPS Connector 34, within that environment. As part of executing the OPS Connector 34, the PA Connector 32 passes the data it received from the PA Agent 30 to the OPS Connector 34 as parameter values.

The OPS Connector 34 then determines whether the target program that will perform the mainframe function/automation should be invoked synchronously or asynchronously. This may be accomplished using any means desired, but in one embodiment, the mainframe automation operators include a parameter (e.g., "SYNC" or "ASYNC") that indicates the type of execution for the target program. The value of the parameter is passed as data to the OPS Connector 34 when the OPS Connector 34 is invoked. The OPS Connector 34 inspects this parameter value and, if synchronous execution is required (e.g., "SYNC"), invokes the target OPS/MVS OPS REXX-based program within the OPS REXX 42 environment. If asynchronous execution is required (e.g., "ASYNC"), the OPS Connector 34 queues the target OPS/MVS OPS REXX-based program for execution within the OPS/MVS OSF Server 52 environment of the base OS layer 50.

One of the reasons for executing a given target-based REXX program synchronously or asynchronously is whether the automated process (e.g., AddEmployee) must suspend its own processing until the target program is finished executing. Synchronous processing is meant for when it is important that the target program finish executing before the automated process continues executing. For example, the OPS Connector 34 may issue an OPS REXX "CALL" command, which invokes a target program synchronously within the same execution environment (i.e., the OPS REXX 42 environment). With this command, the code in the PA Agent 30 associated with the processing of the target program, the PA Connector 32, the OPS Connector 34, and the target program all execute within the same Unix® process/thread. Thus, control is not passed back to the OPS Connector 34 until execution of the target program is complete. This causes the PA Connector 32, the PA Agent 30, and automated process running on the PA orchestrator 28 to wait until the target program is complete before executing the next operator in the process.

Asynchronous processing, however, is meant for launching target programs that do not need to finish executing before the automated process continues executing. In these cases, control is returned to the OPS Connector 34 at the time the target program is queued for execution. Thus, the automated process running on the PA orchestrator 28, the PA Agent 30, PA Connector 32, and the OPS Connector 34 continue their processing without waiting for the mainframe automation to complete. By way of example, the OPS Connector 32 may issue a OPS/MVS REXX "ADDRESS OSF" command. This command places the target program on a queue to be processed by the OPS/MVS OSF server. When the OPS/MVS OSF server removes the target program from the queue, the target program executes in the OSF Server 52 environment running within the base OS layer 50; however, control is returned to the OPS Connector 34 upon the ADDRESS OSF command successfully placing the target program on the server queue.

Another reason for executing a given target program synchronously or asynchronously is whether return data is important. Particularly, with asynchronous execution, the target program and the OPS Connector 34, execute in different environments. Communicating data between processes executing in different environments is not trivial, and thus, asynchronous execution is not normally utilized where return data is needed from the executing target program. With synchronous execution, however, the target program and the OPS Connector 34 execute in the same environment. Thus, both have access to an OPS/MVS OPS REXX external data queue (EDQ). This allows the target program to share the EDQ and its contents with the OPS Connector 34. Therefore, to return data to the OPS Connector 34, the target-based REXX program simply places the return data on the EDQ. The OPS Connector 34 can then retrieve the return data from the EDQ and create corresponding files to pass back to the PA orchestrator 28 via the PA Connector 32 and PA Agent 30.

More specifically, the PA Agent 30 creates a temporary directory during operator processing specifically for containing the files placed there by the OPS Connector 34. The PA Connector 32 also has access to the temporary directory path via an environmental variable created by the PA Agent 30, and identifies the temporary directory path to the OPS Connector 34 as a parameter when it launches the OPS Connector 34. When the OPS Connector 34 creates the files from the data in the EDQ, the PA Agent 30 creates dataset variables for the mainframe automation operator from those files and returns those dataset variables to the dataset of the mainframe automation operator in the automated process executing on the PA orchestrator 28.

Figure 4:
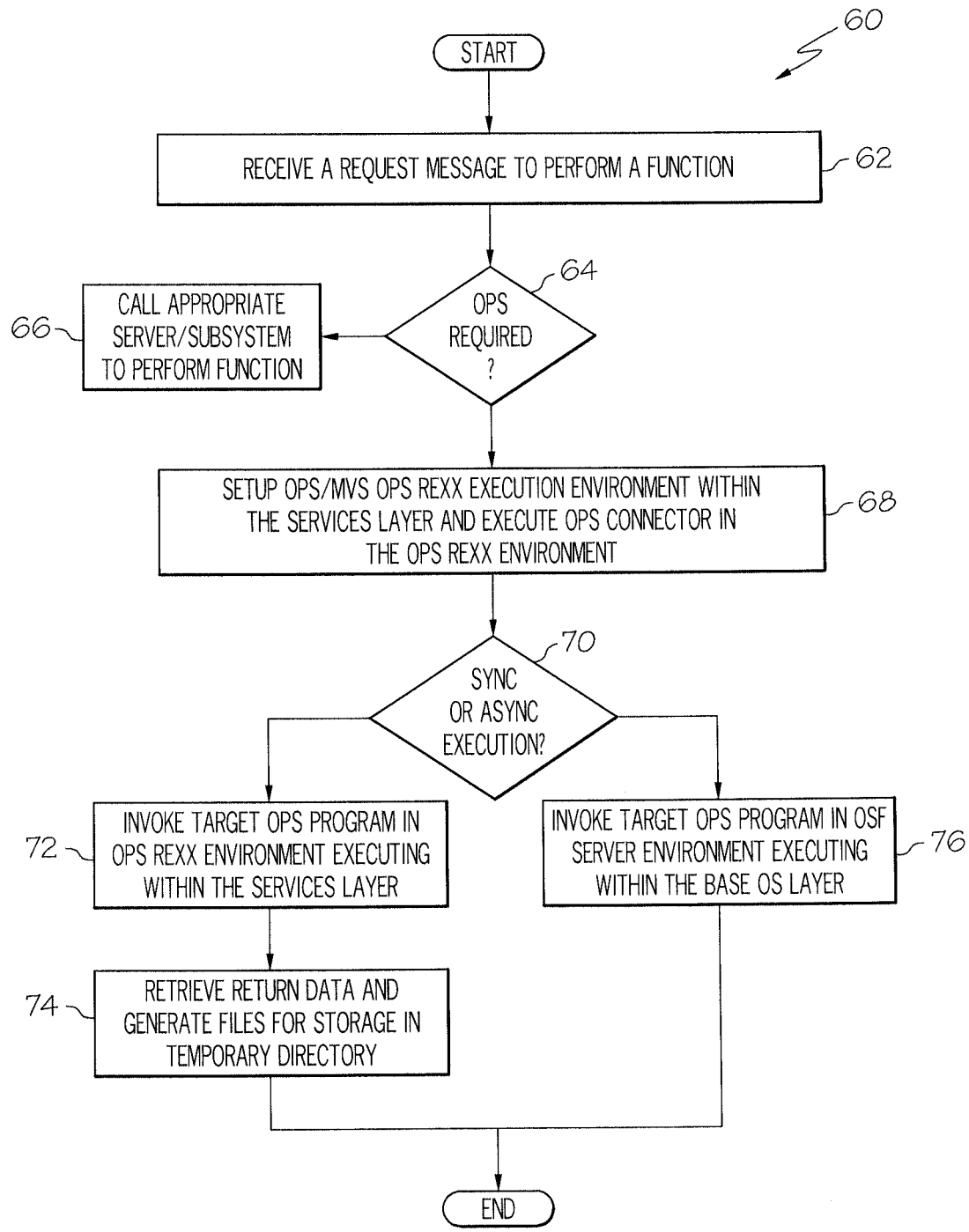
FIG. 4 is a flow diagram illustrating a method for interfacing a Process Automation (PA) application with functions executing on a mainframe computing device.

FIG. 4 is a flow diagram that illustrates a method 60 performed by the controller 22 at mainframe 20 according to one embodiment in more detail. Method 60 begins with the PA Agent 30 receiving a request message from the PA orchestrator 28 to perform a function on the mainframe 20 (box 62). The request message identifies one or more actions or events that need to occur to perform an automated function on the mainframe 20, such as to define and test security resources for a new employee. The PA Agent 30 passes the received message to the PA Connector 32, which then determines, based on the received data, whether the requested function is an OPS/MVS function that requires an OPS/MVS environment to execute (box 64). If the function is not an OPS/MVS function, the PA Connector 32 may forward the request message to whatever subsystem or server is appropriate to perform the identified function (box 66). Otherwise, if the requested function is an OPS/MVS function, the PA Connector 32 issues a command to set-up the OPS REXX 42 environment within the services layer and execute the OPS Connector 34 within that OPS REXX 42 environment (box 68). The PA Connector 32 then passes the OPS Connector 34 the necessary data and information it received from the PA Agent 30.

The OPS Connector 34, upon receipt of the data, identifies the particular target program it is to execute and determines whether the program is to be performed synchronously or asynchronously (box 70). Such a determination may be made, as stated in the example above, based on a "SYNCH"/"ASYNCH" parameter received with the request message. For synchronous execution, the OPS Connector 32 invokes the target program within the OPS REXX 42 environment established within the services layer (box 72) and, if needed, returns any data to the OPS Connector 34 as previously described (box 74). For asynchronous execution (box 70), the OPS Connector 34 queues the target program along with its associated data for execution in the OSF Server 52 environment for execution within the base OS layer (box 76).

Figure 5:
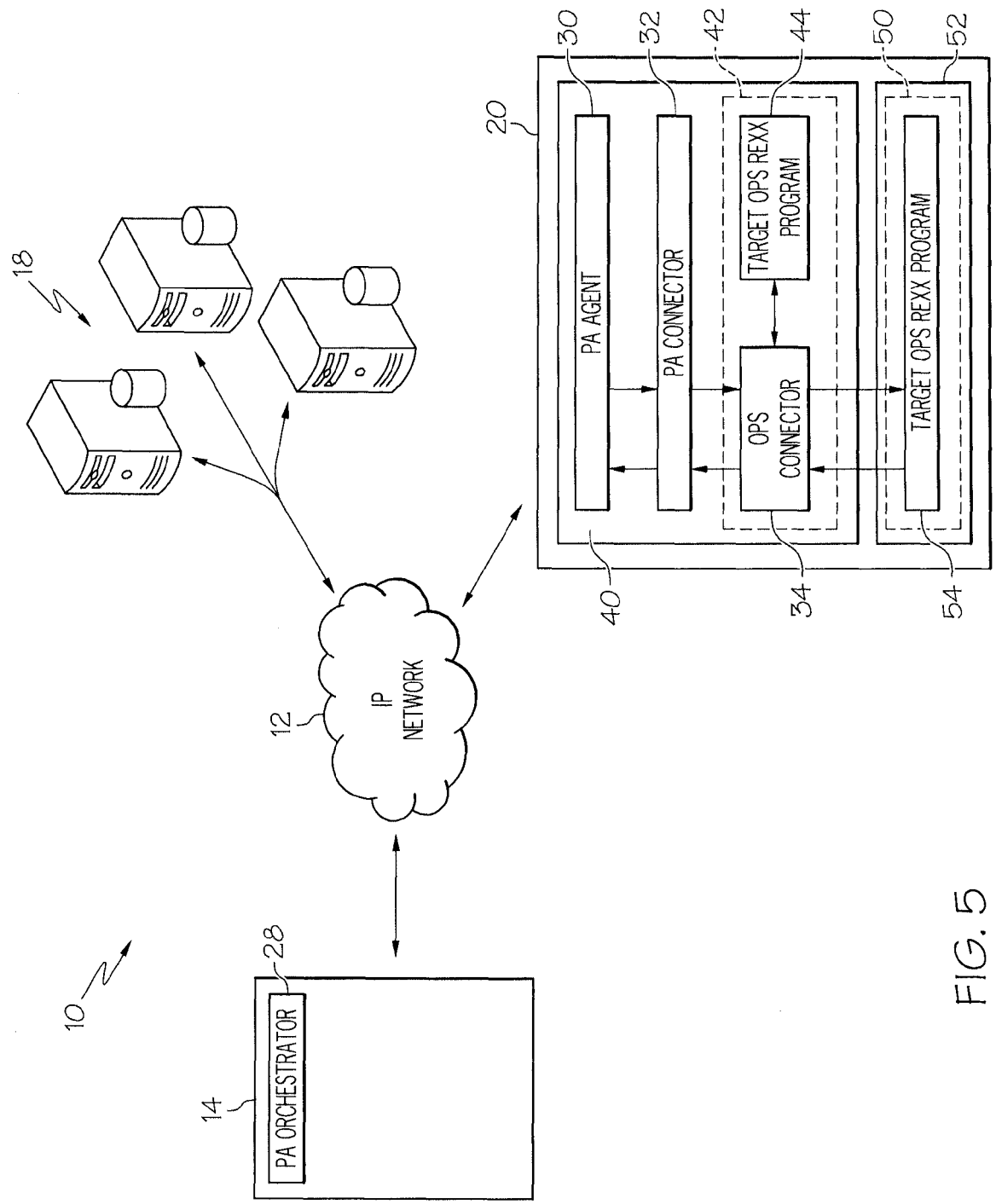
FIG. 5 is a block diagram illustrating an architecture for communicatively interfacing PA applications with functions executing on the mainframe computing device according to an alternate embodiment.

The previous embodiments illustrate the present disclosure as being entirely within the mainframe 20. However, those skilled in the art will appreciate that the method is not so limited. FIG. 5, for example, illustrates a "distributed" architecture in which the PA orchestrator 28 is stored in memory at a workstation, such as workstation 14, while the PA Agent 30, PA Connector 32, and the OPS Connector 34, remain within the mainframe 20 to execute one or more target programs in the OPS REXX 42 environment and the OSF Server 52 environment, as previously described.

Embodiments of the present disclosure provide benefits not realized or possible with conventional systems. For example, the OPS Connector 34 interface allows clients to include existing and future OPS/MVS mainframe automation functions in their Process Automation processes. By way of example, clients will be able to utilize the OPS Connector 34 in their automated business processes to manage mainframe resources state, stop and start the system, perform system maintenance, create and/or update security definitions, perform automated error detection and remediation, and the like. Moreover, the OPS Connector 34 negates the need for the client operators to manually invoke multiple mainframe processes thereby reducing errors and increasing efficiency. The efficiency is further increased because the OPS Connector 34 "hooks" directly into the base OS of the mainframe 20 to execute target OPS/MVS OPS REXX programs. Additionally, the OPS Connector 34 allows mainframe operators to leverage their existing automation programs and scripts rather than having to re-write these programs and scripts to operate on another non-native application. Further, the architecture is such that it can be expanded to include custom connectors to additional mainframe applications, such as workload applications, system monitoring and performance applications, and security applications, for example.

It should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    receiving a request from an agent executing on a mainframe computing device to perform a function on the mainframe computing device, the request including information that identifies a corresponding target program to be executed on the mainframe computing device;
    determining whether the target program is to be executed on the mainframe computing device synchronously or asynchronously based on an indicator received with the request;
    executing the target program in a first execution environment running within a services layer of the mainframe computing device if the indicator indicates that the target program is to be executed synchronously; and
    executing the target program in a second execution environment running within a base Operating System (OS) layer of the mainframe computing device if the indicator indicates that the target program is to be executed asynchronously, wherein the second execution environment is different than the first execution environment.

2. The method of claim 1 further comprising establishing an execution environment in the services layer of the mainframe computing device if the indicator indicates that the target program is to be executed synchronously.

3. The method of claim 2 wherein executing the target program in a services layer of the mainframe computing device if the indicator indicates that the target program is to be executed synchronously further comprises executing the target program within the execution environment running in the services layer of the mainframe computing device.

4. The method of claim 1 wherein executing the target program in a base Operating System (OS) layer of the mainframe computing device if the indicator indicates that the target program is to be executed asynchronously comprises executing the target program in an execution environment running within the base OS layer of the mainframe computing device.

5. The method of claim 1 wherein the function is associated with an automated process to be executed on the mainframe computing device.

6. The method of claim 1 further comprising returning data from the executing target program.

7. The method of claim 6 wherein returning data from the executing target program comprises:
    reading return data placed on a queue by the executing target program;
    generating a file from the return data; and
    storing the generated files in a temporary directory path accessible to the agent from which the request was received.

8. The method of claim 1 further comprising:
determining whether the target program is to be executed on the mainframe computing device or by a subsystem associated with a remote computing device; and
generating a command to execute the target program at the remote device if the target program is to be executed by the subsystem associated with the remote computing device.

9. A computer comprising:
a communication interface to communicate data with a remote computing device over a communication network; and
a processor circuit configured to:
receive a request from an agent process to perform a function on a mainframe computing device, the request including information that identifies a corresponding target program to be executed on the mainframe computing device;
determine whether the target program is to be executed on the mainframe computing device synchronously or asynchronously based on an indicator received with the request;
execute the target program in a first execution environment running within in a services layer of the mainframe computing device if the indicator indicates that the target program is to be executed synchronously; and
execute the target program in a second execution environment running within in a base Operating System (OS) layer of the mainframe computing device if the indicator indicates that the target program is to be executed asynchronously, wherein the second execution environment is different than the first execution environment.

10. The computer of claim 9 wherein the controller is further configured to initiate an execution environment in the services layer of the mainframe computing device if the indicator indicates that the target program is to be executed synchronously.

11. The computer of claim 10 wherein the controller is further configured to execute the target program within the execution environment running in the services layer of the mainframe computing device.

12. The computer of claim 9 wherein the controller is further configured to execute the target program in an execution environment running within the base OS layer of the mainframe computing device.

13. The computer of claim 9 wherein the controller is further configured to:
read return data placed on a queue by the executing target program;
generate a file from the return data; and
store the generated file in a temporary directory path accessible to the agent from which the request was received.

14. The computer of claim 9 wherein the computer is the mainframe computing device communicative connected to a workstation via a communication network.

15. The computer of claim 9 wherein the computer is a workstation communicatively connected to the mainframe computing device via a communication network.

16. A computer program product comprising:
a computer readable storage medium storing computer program code, which when executed by a processing circuit on a computing device, configures the processing circuit to:
receive a request from an agent process to perform a function on a mainframe computing device, the request including information that identifies a corresponding target program to be executed on the mainframe computing device;
determine whether the target program is to be executed on the mainframe computing device synchronously or asynchronously based on an indicator received with the request;
execute the program in a first execution environment running within a services layer of the mainframe computing device if the indicator indicates that the target program is to be executed synchronously; and
execute the program in a second execution environment running within a base Operating System (OS) layer of the mainframe computing device if the indicator indicates that the target program is to be executed asynchronously, wherein the second execution environment is different than the first execution environment.

17. The computer program product of claim 16 wherein the computer readable storage medium further stores computer program code configured to establish an execution environment in the services layer of the mainframe computing device if the indicator indicates that the target program is to be executed synchronously.

18. The computer program product of claim 17 wherein the computer readable storage medium further stores computer program code configured to execute the target program within the execution environment running in the services layer of the mainframe computing device.

19. The computer program product of claim 16 wherein the computer readable storage medium further stores computer program code configured to execute the target program in an execution environment running within the base OS layer of the mainframe computing device.

20. The computer program product of claim 16 wherein the computer readable storage medium further stores computer program code configured to:
determine whether the target program is to be executed on the mainframe computing device or by a subsystem associated with a remote computing device; and
generate a command to execute the target program at the remote device if the target program is to be executed by the subsystem associated with the remote computing device.

* * * * *

UNITED STATES PATENT AND TRADEMARK OFFICE
CERTIFICATE OF CORRECTION

PATENT NO. : 8,938,490 B2  
APPLICATION NO. : 13/670789  
DATED : January 20, 2015  
INVENTOR(S) : Norris et al.

It is certified that error appears in the above-identified patent and that said Letters Patent is hereby corrected as shown below:

In the claims,

At column 15, line 24 (claim 9, line 16), please delete "in" after within.

At column 15, line 29 (claim 9, line 21), please delete "in" after within.

Signed and Sealed this  
Twentieth Day of October, 2015

Michelle K. Lee  
*Director of the United States Patent and Trademark Office*